United States Patent
Gayde et al.

(10) Patent No.: US 8,914,028 B2
(45) Date of Patent: Dec. 16, 2014

(54) AUTOMATED TRIGGERS FOR APPLICATION OF CELL ASSOCIATION BIAS AND/OR INTERFERENCE MITIGATION TECHNIQUES

(75) Inventors: Ruth Schaefer Gayde, Naperville, IL (US); Subramanian Vasudevan, Morristown, NJ (US); Anil M. Rao, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 384 days.

(21) Appl. No.: 13/210,148

(22) Filed: Aug. 15, 2011

(65) Prior Publication Data

US 2013/0045740 A1    Feb. 21, 2013

(51) Int. Cl.
H04W 36/00      (2009.01)
H04W 48/06      (2009.01)
H04W 48/20      (2009.01)

(52) U.S. Cl.
CPC .............. *H04W 48/06* (2013.01); *H04W 48/20* (2013.01)
USPC .......................................................... 455/436

(58) Field of Classification Search
CPC ..... H04W 36/22; H04W 48/06; H04W 36/20; H04W 28/08; H04W 28/02
See application file for complete search history.

(56) References Cited

U.S. PATENT DOCUMENTS

| | | | | |
|---|---|---|---|---|
| 8,103,310 | B1 * | 1/2012 | Srinivas et al. | 455/561 |
| 8,228,853 | B2 * | 7/2012 | Ji et al. | 370/329 |
| 2011/0249642 | A1 * | 10/2011 | Song et al. | 370/329 |
| 2011/0319025 | A1 * | 12/2011 | Siomina et al. | 455/63.1 |
| 2012/0026972 | A1 * | 2/2012 | Miao et al. | 370/331 |
| 2012/0113961 | A1 * | 5/2012 | Krishnamurthy | 370/332 |
| 2012/0188884 | A1 * | 7/2012 | Simonsson et al. | 370/252 |
| 2012/0282864 | A1 | 11/2012 | Dimou et al. | |
| 2013/0010713 | A1 * | 1/2013 | Folke et al. | 370/329 |
| 2013/0130682 | A1 * | 5/2013 | Awad et al. | 455/434 |
| 2014/0079026 | A1 | 3/2014 | Dimou et al. | |

FOREIGN PATENT DOCUMENTS

GB          2 397 469          7/2004

OTHER PUBLICATIONS

International Search Report, 2012.
Qualcomm Incorporated: "Introduction of enhanced ICIC," $3^{rd}$ generation partnership project, France, vol. RAN WG2, No. Xi'an 20101011, Oct. 5, 2010.
Mediatek Inc. "eICIC of PCFICH and PDCCH in MeNB Plus HeNBs Deployment," $3^{rd}$ generation partnership project, vol. RAN WG1, No. Dresden, Germany, Jun. 22, 2010.

* cited by examiner

*Primary Examiner* — Patrick Edouard
*Assistant Examiner* — Shantell L Heiber
(74) *Attorney, Agent, or Firm* — Fay Sharpe LLP (57) ABSTRACT

In a wireless telecommunications network, there is included: a macro cell (10) having a first coverage area; and at least one metro cell (20a, 20b, 20c) having a second coverage area, the metro cell being located within the first coverage area of the macro cell. Suitably, the macro cell is configured to: determine whether or not the macro cell is congested; determine whether or not the metro cell is uncongested; and, if it is determined the macro cell is congested and that the metro cell is uncongested, then the macro cell determines that an attempted application of Cell Association Bias (CAB) for the metro cell is warranted. Suitably, if CAB is in fact applied, the macro cell also implements enhanced Inter Cell Interference Coordination (eICIC) using Almost Blank Subframes (ABS) and informs its other neighboring metro cells of this configuration.

23 Claims, 4 Drawing Sheets

AUTOMATED TRIGGERS FOR APPLICATION OF CELL ASSOCIATION BIAS AND/OR INTERFERENCE MITIGATION TECHNIQUES

BACKGROUND

The present inventive subject matter relates generally to the art of mobile telecommunications systems. Particular but not exclusive relevance is found in connection with heterogeneous LTE (Long Term Evolution) networks, e.g., as proposed by 3GPP (the $3^{rd}$ Generation Partnership Project), and accordingly the present specification makes specific reference thereto. It is to be appreciated however that aspects of the present inventive subject matter are also equally amenable to other like applications.

Heterogeneous LTE networks are generally known in the art of cellular and/or mobile telecommunications. In one deployment strategy, some cells can be located in or near the coverage area of other cells. Neighboring cells will at times operate in the same frequency spectrum, at least partially. This can lead to interference problems which are typically desirable to mitigate. Additionally, there is generally a desire to load balance traffic among the cells, optimize throughput and improve network performance.

Accordingly, new and/or improved processes and/or network elements are disclosed herein which address one or more of the above-referenced concerns(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a wireless telecommunications network is provided. The network includes: a macro cell having a first coverage area; and at least one metro cell having a second coverage area, the metro cell being located within the first coverage area of the macro cell. Suitably, the macro cell is configured to: determine whether or not the macro cell is congested; determine whether or not the metro cell is uncongested; and, if it is determined the macro cell is congested and that the metro cell is uncongested, then the macro cell determines that an attempted application of Cell Association Bias (CAB) for the metro cell is warranted.

In accordance with another embodiment, a first base station is provided in a wireless telecommunications network. The first base station defines a first cell having a coverage area and the network includes at least one second base station defining a second cell at least partially within the coverage area of the first cell. The first base station is suitably provisioned to execute a method including: determining whether or not the first cell is congested; determining whether or not the second cell is uncongested; and, if it is determined the first cell is congested and that the second cell is uncongested, then determining that an attempted application of CAB for the second cell is warranted.

In accordance with another embodiment, in a wireless telecommunications network comprising a first base station defining a first cell having a coverage area, a second base station is provided. Suitably, the second base station defines a second cell located at least partially within the coverage area of the first cell, and the second base station is provisioned to execute a method including: determining that a portion of a load being carried by the second base station is coming from one or more mobile UEs located proximate to an outer edge of the second cell, such that not all the UEs so located can be scheduled in available subframes during which the first base station may be blanking; in response to the determining, sending a request to the first base station for increasing the number of subframes during which the first base station blanks; and receiving a response from the first base station to the request, the response indicating a grant of the request and identifying in which subframes the first base station will blank.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Figure 1:
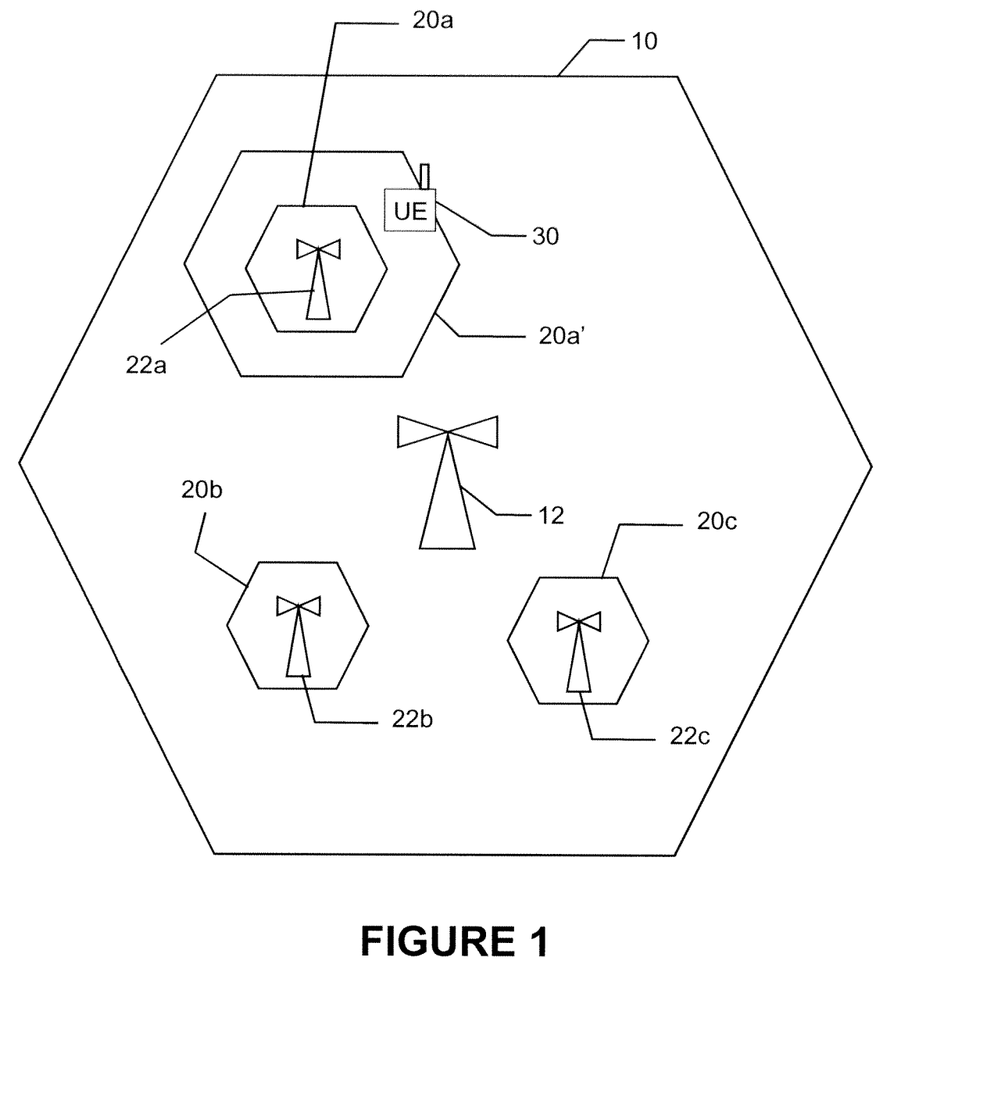
FIG. 1 is a diagrammatic illustration showing at least a portion of an exemplary telecommunications network suitable for practicing aspect of the present inventive subject matter.

With reference now to FIG. 1, there is shown a portion of a cellular telecommunications network, e.g., a heterogeneous LTE network. In particular, as shown, the network includes a first larger or macro cell 10 and a plurality of smaller or metro cells deployed within the coverage area of the macro cell 10. As shown, there are three metro cells 20a, 20b and 20c deployed within the coverage area of the macro cell 10. However, in practice, there may be more or fewer similarly situated metro cells. Likewise, the overall network may include a greater number of similarly arranged macro cells.

Generally, each cell is supported by a base station (BS), e.g., an eNB (eNodeB or evolved Node B), that selectively communicates with one or more mobile stations or UEs (user equipment) which are generally within a coverage area of the cell, e.g., via a wireless RF (radio frequency) interface or other like over-the-air (OTA) interface. Suitably, the macro cell and the metro cells operate at least partially within the same frequency spectrum. The nominal coverage area or RF footprint of each cell is generally determined in part by the transmission power of the associated BS. As shown, the macro cell 10 is supported by a BS 12, and the metro cells 20a, 20b and 20c are supported by BS 22a, 22b and 22c, respectively. Suitably, the metro cells may be, e.g., microcells, picocells, femtocells or the like or some combination thereof. In any event, the transmission power of each metro cell's BS is generally less than the transmission power of the macro cell's BS, and hence the relative sizes or nominal coverage areas of the cells are thusly reflected in FIG. 1.

As can be appreciated, the deployment strategy illustrated in FIG. 1 allows UEs close to or within a metro cell's coverage area to connect to and/or access the network through the metro cell and thereby experience greater throughput and/or signal strength than they might otherwise enjoy from the surrounding macro cell 10. One technique for increasing total network throughput, load balancing and/or improving network performance is to artificially extend the perceived range of a metro cell from the perspective of UEs and hence encourage the UEs to access the network through the metro cell when they would otherwise normally choose to access the network through the macro cell. This technique is referred to as range extension, achieved through the application of cell association bias (CAB), and CAB can be selectively implemented, i.e., turned on and/or off as desired by a network operator. When CAB is turned on, it can result in the effective offloading of UEs (and their respective traffic) from the macro cell onto particular metro cells.

To select which cell it will use to access the network, a UE will normally measure the strength of a received signal from one or more BS and select the cell which has the strongest signal. However, when CAB is applied, the macro cell 10 (or more specifically the BS 12) signals or otherwise instructs the UEs to add a delta value (or bias amount) to the measured signal strength, e.g., of one of the metro cells. In this way, the UEs will perceive the signal strength of the metro cell as being greater than its actual measured value. In turn, this will cause some UEs at or near an outer edge of the metro cell's coverage area to favor selection of the metro cell over the macro cell. To illustrate, consider a UE 30 just outside an outer edge of the nominal coverage area of the metro cell 20a where the actual measured signal strength from the macro cell 10 is somewhat greater than the actual measured signal strength from the metro cell 20a. Nevertheless, when CAB is turned on in this example, provided the measured signal strength from the metro cell 20a plus the delta value is greater than the measured signal strength from the macro cell 10, then the UE 30 will select the metro cell 20a as opposed to the macro cell 10 which it would have otherwise selected absent the application of CAB. In this way, from at least the perspective of the UE 30, the range of the metro cell 20a is artificially extended (i.e., without actually increasing the transmission strength of its BS 22a). Of course, depending on the bias amount or delta value, the perceived effective range of the metro cell 20a can be artificially extended more or less. As illustrated, the artificially expanded coverage area 20a' in this example encompasses the UE 30 and hence the UE's preference for connecting to the network through the metro cell 20a over the macro cell 10.

One condition that can arise when the macro cell and metro cells operate in the same frequency spectrum, particularly for UEs located at or near the outer edge of a metro cell's coverage area, is that UEs otherwise connected to the metro call may experience problematic interference from the macro cell. Employing CAB can further aggravate this condition by urging more UEs at or near the outer edge of the metro cell's coverage area to connect to the network through the metro cell as opposed to through the macro cell.

To mitigate the aforementioned interference problem, a feature referred to as enhanced inter cell interference coordination (eICIC) has been defined in 3GPP standards that enables two neighboring BS or cells to coordinate their transmissions during specific slices of time, referred to as subframes. In this context, "neighboring" BS or cells refers to BS or cells that handover UE from one to another. To provide eICIC, a technique referred to as almost blank subframes (ABS) can be employed. When ABS is employed, the macro cell 10 (or more specifically its BS 12) will intermittently or periodically blank during given subframes. That is to say, when blanking, the macro cell or its BS will essentially send no information or data (although some pilot and broadcast signals may be transmitted). Conversely, a neighboring metro cell which is synchronized with the macro cell can use those same subframes when the macro cell is blanked to serve UEs that are in high interference conditions, e.g., those UEs at or near an outer edge of the metro cell's coverage area. Suitably, as a greater number of UEs connecting to the network through a metro cell experience high interference conditions, a greater amount of ABS is applied. That is to say, the macro cell blanks at a greater frequency to allow more time or more blank subframes for the metro cell to serve the increased number of UEs experiencing high interference conditions. Conversely, as fewer UEs connecting to the network through the metro cell experience high interference conditions, less ABS is applied, i.e., the macro cell blanks at a lower frequency or less often, thereby maximizing the number of subframes during which the macro cell may transmit.

As with CAB, the use of ABS to achieve eICIC is selectively implemented, i.e., turned on and/or off as desired by a network operator. Conventionally, both CAB and eICIC via ABS were implemented manually by the network operator. That is to say, conventionally, the features had to be either turned on or turned off by specific intervention of the network operator. The manual implementation of these features can be a considerable burden to network operators. Moreover, there has been conventionally no automated mechanism for calculating or otherwise determining how much bias (i.e., how large a delta value) to apply in connection with the CAB technique to achieve the desired load balancing and/or beneficial network performance, nor was there a mechanism for notifying other metro cells when and/or where CAB was being implemented. Furthermore, while generally effective for their intended purposes, the continual use of these features can be undesirable. For example, it may be undesirable to utilize CAB with respect to a given metro cell when that metro cell is already heavily congested with UEs and/or the macro cell has plenty of available bandwidth. In another example, it may be undesirable to continually employ ABS insomuch as blanking subframes can reduce the overall throughput of the macro cell which has substantially limited or no transmission rights during the blanked subframes. In short, there have been previously no suitable mechanisms for determining if and/or when to implement either CAB or eICIC via ABS, nor has there been previously a suitable mechanism for determining how much CAB to apply or how much ABS to apply. Moreover, there have not been previously suitable mechanisms for communicating among the respectively cells if, when, where and/or how much ABS and/or CAB were being applied, nor has there previously been a suitable mechanism for a metro cell to trigger a request to the macro cell that ABS be implemented or inform the macro cell how much ABS is desired by the metro cell.

Accordingly, in a suitable embodiment, the macro cell 10 (or more specifically its BS 12) is configured and/or otherwise provisioned to calculate and/or otherwise determine if and/or when to apply CAB for one or more of the metro cells in order to benefit network performance. Suitably, this mechanism and/or process takes into consideration not only the conditions being experienced at and/or the state of the macro cell, but also the conditions being experienced at and/or the state of the metro cell at issue.

Figure 2:
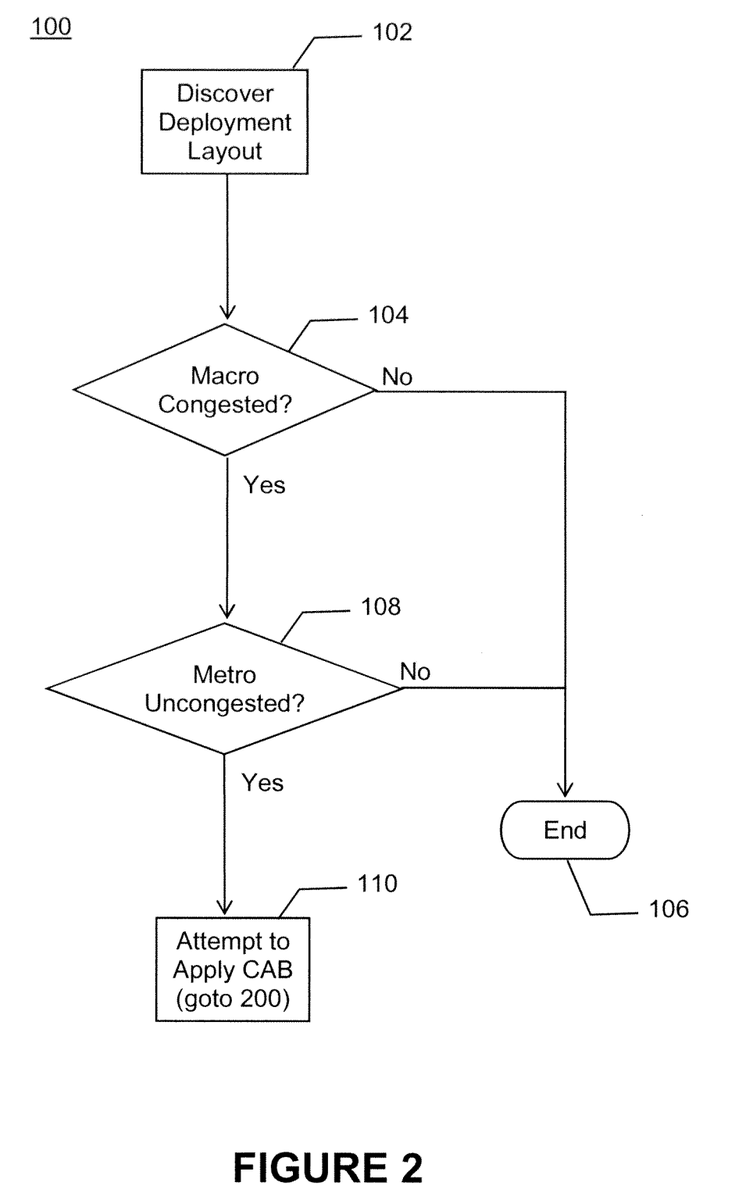
FIG. 2 is a flow chart illustrating an exemplary process executed by a macro cell and/or its base station in accordance with aspect of the present inventive subject matter.

With reference now to FIG. 2, there is shown an exemplary process 100 carried out by the macro cell 10 and/or its BS 12 which determines if and/or when to apply CAB to a given metro cell, In step 102, the macro cell 10 and/or its BS 12 discovers which of its neighboring cells are metro cells. In one embodiment, the macro cell 10 and/or its BS 12 may be configured or otherwise provisioned with this information, e.g., in a suitable memory or database or the like. Alternately, the macro cell 10 and/or its BS 12 may learn this information otherwise. For example, when a request to handover a UE from a neighboring cell is received by the macro cell 10 and/or its BS 12, the handover request will generally report to the macro cell 10 and/or its BS 12 the transmission power or the like of the corresponding neighboring cell. Accordingly, from an examination of reported transmission power it can be determined if the neighboring cell is a metro cell. More specifically, a relatively small reported transmission power would indicate that the neighboring cell from which the corresponding handover was being requested is a metro cell.

At decision step 104, it is then determined if the macro cell 10 is in a congested state. For example, the macro cell 10 may be deemed to be in a congested state if the offered traffic at the macro cell 10 is more than or within some threshold range of the maximum air interface capacity of the macro cell 10, or if the macro cell is operating with or sufficiently near the maximum number of UEs that the macro cell 10 can support to access the network therethrough. If the macro cell 10 is not in a congested state, then no action may be taken and the process 100 can end, e.g., at step 106. Otherwise, if the macro is in a congested state, then it may be desirable to offload one or more UEs to one or more of the overlapping metro cells, e.g., metro cells 20a, 20b and/or 20c. Accordingly, the process 100 may continue to decision step 108 where it is determined if one or more of the metro cells is in an uncongested state and hence has sufficient capacity to receive additional UEs and/or the traffic associated therewith. For example, a given metro cell may be deemed to be in an uncongested state if the offered traffic at the metro cell is sufficiently less than or below some threshold amount of the maximum air interface capacity of the metro cell, or if the metro cell is operating with sufficiently less than the maximum number of UEs that the metro cell can support to access the network therethrough. Again, if no metro cell is deemed to be uncongested, then no action may be taken and the process 100 can end, e.g., at step 106. Otherwise, if one or more metro cells are in an uncongested state, then it may remain desirable to offload one or more UEs to one or more of the uncongested metro cells, e.g., metro cells 20a, 20b and/or 20c. Accordingly, the process 100 may continue to step 110 insomuch as it has been decided that the application of CAB to one or more of the uncongested metro cells will potentially benefit network throughput and/or performance, that is provided a suitable amount of bias can be applied to result in actually offloading one or more UEs from the macro cell to one or more of the metro cells having the capacity to receive the UEs.

Figure 3:
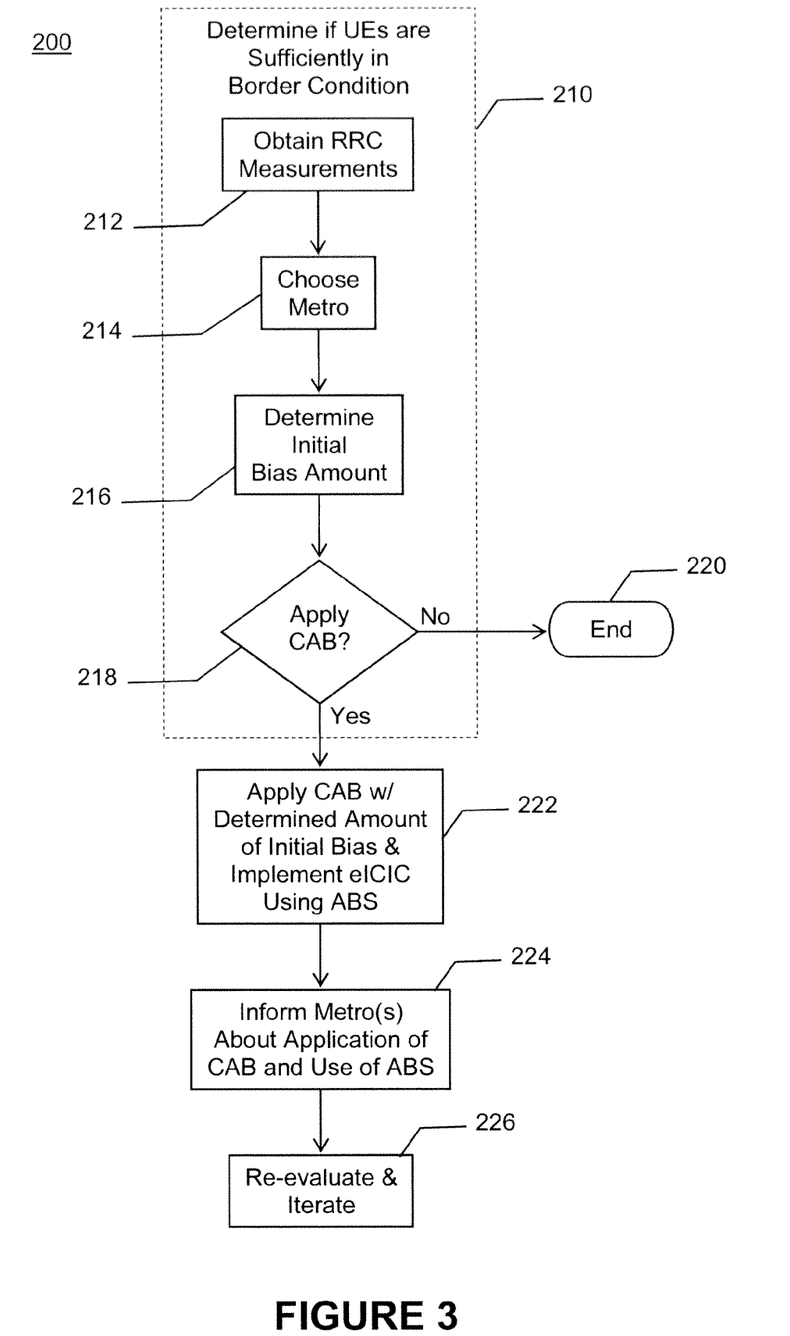
FIG. 3 is a flow chart illustrating another exemplary process executed by a macro cell and/or its base station in accordance with aspects of the present inventive subject matter.

With reference now to FIG. 3, having concluded that an attempt to apply CAB to one or more of the metro cells may benefit network throughput and/or performance, the macro cell 10 may be further configured and/or provisioned to carry out the process 200 wherein, among other things, the macro cell 10 and/or its BS 12 calculates and/or otherwise determines if in fact a feasible application of CAB to one or more of the metro cells will suitably achieve the desired objective (i.e., the offloading of UEs from the macro cell to one or more of the metro cells) and if so what is the desired amount of bias to apply. As will be appreciated from a further reading of the present specification, determining the amount of bias to apply can be achieved with an iterative approach in which the bias is gradually increased until a desired steady state is ready.

As shown in FIG. 3, the process 200 begins at step 210 with the macro cell 10 and/or its BS 12 determining whether or not there are UEs in a border condition with respect to the metro cells (i.e., whether or not there are UEs at or near an outer edge of a metro cell's coverage area). For example, to do this, a number of sub-steps may be executed or otherwise carried out by the macro cell 10 and/or its BS 12.

In a suitable embodiment, at sub-step 212 the macro cell 10 and/or its BS 12 may; (i) request RRC (Radio Resource Control) measurements from the UEs being served by the macro cell 10, including the RSRP (Reference Signal Receive Power) of the strongest neighboring metro cell (i.e., the metro cell having the strongest RSRP for a given UE) and the RSRP of the serving macro cell 10; and, (ii) then calculate or otherwise determine the difference between the obtained RSRPs in each case.

At sub-step 214, the process 200 continues with the metro cell 10 and/or its BS 12 selecting a metro cell. To start, the selected metro cell may be the one having the highest number of UEs reporting it as the strongest neighbor. At sub-step 216, an initial bias amount is set or otherwise selected for application of CAB to the selected metro cell, e.g., by the macro cell 10 and/or its BS 12. The initially selected bias amount is generally the amount that will induce one or more of the UEs being served by the macro cell 10, but otherwise in a border condition with respect to the selected metro cell, to be handed over to the selected metro cell. For example, the macro cell 10 and/or its BS 12 may select or otherwise set the initial bias amount to be slightly larger than the smallest RSRP difference calculated or otherwise determined from the RRC measurements reported to the macro cell 10 and/or its BS 12 from all the UEs in a border condition with respect to the selected metro cell.

At decision sub-step 218, the macro cell 10 and/or its BS 12 decides whether to actually apply CAB to the selected metro call based on the determined initial bias from sub-step 216. If the initial bias amount is larger than a maximum which can be supported, then no action may be taken and the process 200 may end at step 220 since in this case the artificial extension of the metro cell's coverage area will not help capture any UEs—i.e., no UEs will be induced to hand over from the macro cell to the metro cell, e.g., because all the UEs still reside outside even the artificially extended coverage area of the metro cell. Suitably, the maximum bias amount which can be supported is taken as the difference between the transmission power of the macro cell's BS 12 (e.g., in dBm) and the transmission power of the selected metro cell's BS (e.g., in dBm). Otherwise, if the initial bias amount is substantially equal to or smaller than the maximum which can be supported, then at step 222 CAB is applied for the selected metro cell by the macro cell 10 and/or its BS 12 using the initial bias determined in sub-step 216 as the delta value. Additionally, at step 222 eICIC may be applied using ABS with an initial number of blanked subframes at the macro cell 10 sufficient to allow the metro cell to serve the additional handed over UEs during those subframes that are blanked for the macro cell 10.

Suitably, at step 224, the macro cell 10 and/or its BS 12 signals or otherwise informs one or more of its neighboring metro cells and/or their respective BS about the application of CAB and/or implementation of eICIC using ABS. In one exemplary embodiment, all the neighboring metro cells are provided the eICIC and/or ABS information from the macro cell 10 and/or its BS 12. Suitably, the macro cell informs all of the neighboring metro cells that ABS has been turned on, and in what subframes the macro cell will blank. For example, this may be done by sending a "Load Information" X2 message from the macro cell to all the metro cells. Suitably, this message can contain the ABS Information IE (information element).

When CAB has been applied by the macro cell 10 for a particular metro cell, suitably the macro cell will inform the metro cell, via signaling, sending a message or otherwise, that the bias is in effect so that the metro cell will update its mobility parameters in response. In this way, futile attempts to handover UEs from the metro call back to the macro cell can be avoided. For example, there are two ways the metro cell can be made aware of the application of CAB. In one way, the macro cell can directly inform the metro cell, e.g., using an X2 interface and a message such as the "Mobility Change Request" message or the "Load Information" message. In another way, the metro cell can observe that based on rejected handover requests from the metro cell to the macro cell that a certain amount of bias is being added to the handover thresholds on the macro cell side. In particular, based on the measurement levels that had been reported by the UE in advance of the failed handover attempt, the metro cell determines how much bias has been set by the macro cell, and this value is optionally refined as more measurements and failed handovers are reported.

Suitably, at step 226, the macro cell 10 and/or its BS 12 may re-evaluate and can iteratively carry out further of the above described process steps as may be desired to make additional network performance improvements.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein. For example, after a first iteration of the foregoing processes and/or steps, some UEs will be re-associated and/or handed over from the macro cell to one or more of the metro cells. However, the macro cell may still be congested and there may still be one or more metro cells that are uncongested, e.g., as determined from re-executing the process 100. In this case, the macro may decide to apply CAB to all its neighboring metro cells with the previously determined bias, or it may consider each metro cell on a case by case basis. In the latter situation, the process may return to step 214 where the macro cell will choose the next metro cell, e.g., metro cell having the next largest number of UEs reporting it as the strongest neighbor. The process 200 may then be carried out from there with respect to the newly chosen metro cell. This cycle is optionally repeated until all the metro cells have been addressed and CAB has been applied as appropriate. Notably, additional blanking may not be applied in each instance as the metro cells may share the same subframes in which the macro cell is blanked for serving the UEs in high interference conditions insomuch as generally the metro cells will not interfere with each other.

Once CAB has been applied for all applicable metro cells at the initial bias level, then if the macro cell is still congested, the macro cell 10 and/or its BS 12 may iteratively increase the bias amount in stepwise fashion, and re-evaluate if additional blanking by the macro cell is to be implemented in order to serve the additional UEs being re-associated and/or otherwise handed over to the metro cells. Suitably, these iterative procedures are continued until either (i) the macro cell is no longer congested, or (ii) there is no suitably uncongested metro cell left, or (iii) the maximum supportable bias amount is being used.

Figure 4:
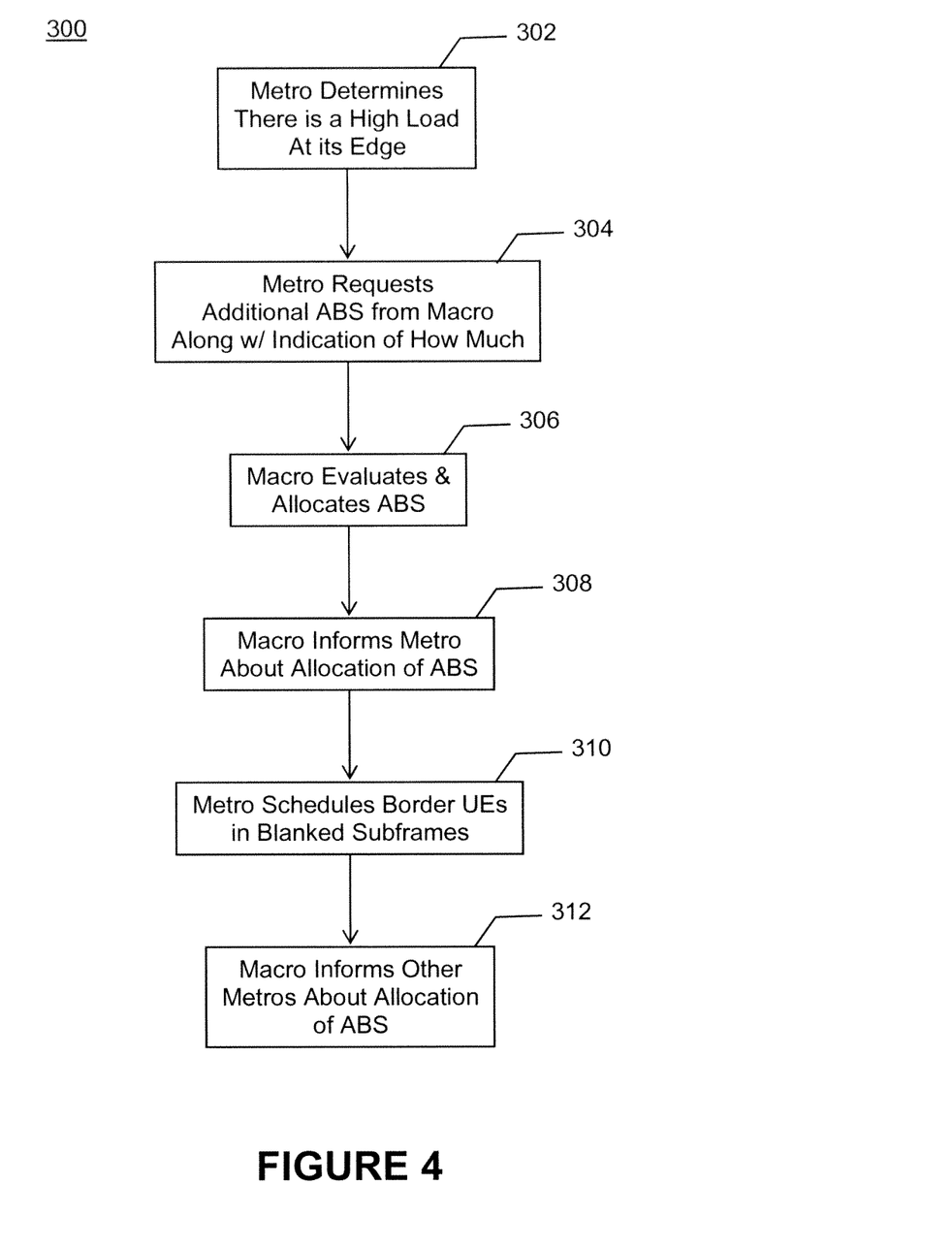
FIG. 4 is a flow chart illustrating yet another exemplary process executed within the network illustrated in FIG. 1, in accordance with aspects of the present inventive subject matter.

With reference now to FIG. 4, there is shown a process 300 optionally carried out or otherwise executed by a metro cell and/or the macro cell as appropriate. In this case, the metro cell is configured and/or otherwise provisioned to request additional blanking by the macro cell 10, and the macro cell is configured and/or otherwise provisioned to respond to that request as well as inform other neighboring metro cells of the outcome if additional blanking is granted. Suitably, the process 330 may be executed when the metro cell is already subjected to CAB, and the macro cell may already be employing ABS with some number of blank subframes.

As shown, the process begins at step 302 with the metro cell or its BS determining that a high percentage (e.g., above some set threshold) of its load is coming from an outer edge of its coverage area, and that not all the corresponding UEs can be scheduled in whatever subframes are already blanked by the macro cell 10. Accordingly, at step 304, the metro cell sends a request to the macro cell, along with an indication of the number of blank subframes requested based on how many UEs are in the border condition.

At step 306, the macro cell 10 and/or its BS 12 evaluates capacity tradeoff, considering also its other neighboring metro cells, and allocates additional ABS as appropriate, i.e., increase the number of subframes during which the macro cell 10 blanks. Accordingly, at step 308, the macro cell 10 responds to the request, e.g., with a message indicating the request has been granted. Suitably, the message may also inform the requesting metro cell which subframes will be blanked by the macro cell. The metro cell may then at step 308 schedule UEs at its border or in high interference conditions during those subframes when the macro cell 10 is blanking. Moreover, at step 310, the macro cell 10 and/or its BS 12 will also inform all of its other neighboring metro cells of the ABS grant, so that they may utilize the additional subframes during which the macro cell is blanking to schedule their own UEs in high interference conditions.

The foregoing descriptions and/or processes generally deal with situations where there is a desire offload UEs from the macro to the metro cells and hence implement and/or increase CAB and/or ABS accordingly. Additionally, there may be similar processes and/or the macro and/or metro cells may likewise be configured and/or otherwise provisioned to handle essentially the opposite conditions.

For example, the metro cells may be configured and/or otherwise provisioned to determine that they may not demand as much ABS and so inform the macro cell. In particular, a suitable process may be executed when the metro cell is already subjected to CAB, and the macro cell may already be employing ABS with some number of blank subframes. For example, the metro cell or it BS may determine that a relatively low percentage (e.g., below some set threshold) of its load is coming from an outer edge of its coverage area, and that all the corresponding UEs can be scheduled in fewer subframes than are presently being blanked by the macro cell 10. Accordingly, the metro cell sends a request to the macro cell indicating that fewer subframes can accommodate its border UEs (or those UEs in high interference conditions), along with an indication of the number of blank subframes the metro cell will still want to utilize or how many blanked subframes can be now be unblanked from the perspective of the requesting metro cell.

The macro cell 10 and/or its BS 12 in response evaluates capacity tradeoff, considering also its other neighboring metro cells, and adjusts the number of blanked subframes as appropriate, i.e., decreasing the number of subframes during which the macro cell 10 blanks. Accordingly, the macro cell 10 responds to the request, e.g., with a message indicating the request has been granted. Suitably, the message may also inform the requesting metro cell which subframes will continued to be blanked by the macro cell (if any). The metro cell may then schedule UEs at its border or in high interference conditions during those subframes when the macro cell 10 is blanking. Moreover, the macro cell 10 and/or its BS 12 will also inform all of its other neighboring metro cells of the new ABS configuration, so that they may utilize the information in connection with scheduling their own UEs in high interference conditions.

In alternate embodiments, there may be other automatic triggers for selectively implementing CAB and/or ABS. In one embodiment, time of day, day of the week and/or other like temporal measurements can be used as semi-static triggers which automatically turn on and/or off either or both CAB and ABS as appropriate. This can be particularly useful, e.g., when a metro cell is deployed in a location where traffic patterns follow predictable usage, e.g., at lunch hour, rush hour, etc. In addition, other embodiments may simply determine automatically when to trigger the use or cessation of CAB and/or ABS, without actually changing the configuration of network elements in accordance therewith. Rather, when a given trigger is activated or otherwise tripped, a report or notification may be sent or provided to the network operator, e.g., in the form of an alarm or the like. The network operator could then act accordingly on the provided information to either turn on or turn off either or both CAB and ABS.

In another example, the macro cell and/or metro cells may be configured and/or otherwise provisioned to carry out and/or otherwise execute processes to address conditions where the macro cell is uncongested and one or more of the metro cells is congested and has had CAB applied. In this case, the macro cell may first determine that there are UEs in the border area of a metro cell, e.g., in the artificially extend coverage area. Suitably, this determination can be made based on RSRP measurements of the neighboring cells reported by the UEs. Accordingly, the macro cell may respond by decreasing the amount of bias being applied in for such a metro cell. This will generally result in the handover of the border area UEs from the metro cell to the macro cell. Again, the macro cell will then inform the affected metro that it has changed the bias amount, e.g., so that the metro cell can adjust its mobility parameters accordingly. Now the macro cell will re-evaluate whether the amount of ABS currently being implemented is still appropriate, and may adjust that as well. Suitably, any changes to the ABS configuration will in turn be reported from the macro cell to all its neighboring metro cells so they can adjust their scheduling accordingly.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A macro cell of a wireless telecommunications network, said macro cell comprising:
    a macro base station configured to define a macro cell of a wireless telecommunications network and to determine whether or not the macro cell is congested;
    wherein the macro base station is configured to determine whether or not a metro base station defining a metro cell of the wireless telecommunications network is uncongested, said metro cell being located at least partially within the macro cell; and,
    wherein the macro base station is configured to send a message to one or more user equipment located within the macro cell and within an extendable range of the metro cell instructing the corresponding user equipment to apply cell association bias (CAB) to signal strength measurements associated with the metro base station after determining the macro cell is congested and the metro cell is uncongested.

2. The macro cell of claim 1, wherein the macro base station is configured to determine whether or not an attempted application of CAB for the metro cell is warranted, configured to determine an initial bias amount if the application CAB is warranted, and configured to determine if the initial bias amount exceeds a maximum supportable bias amount;
    wherein the macro base station is configured to include the initial bias amount in the message to the one or more user equipment if the initial bias amount does not exceed the maximum supportable bias amount, the corresponding message instructing the corresponding user equipment to apply the initial bias amount to signal strength measurements associated with the metro base station in conjunction with applying CAB.

3. The macro cell of claim 2, wherein the metro base station is configured to determine the macro base station has instructed the one or more user equipment to apply CAB to signal strength measurements associated with the metro base station based upon analysis of failed handover attempts of at least one of the one or more user equipment from the metro cell to the macro cell.

4. The macro cell of claim 2, wherein the macro base station is configured to implement enhanced Inter Cell Interference Coordination (eICIC) using Almost Blank Subframes (ABS) in which the macro base station blanks for one or more subframes in conjunction with the application of CAB to signal strength measurements associated with the metro base station by the one or more user equipment.

5. The macro cell of claim 4, wherein the wireless telecommunications network includes additional metro base stations defining additional metro cells located at least partially within the macro cell;
   wherein said macro base station is configured to inform all metro base stations associated with metro cells at least partially within the macro cell when ABS is implemented by the macro base station.

6. The macro cell of claim 4, wherein the macro base station is configured to automatically trigger activation and de-activation of eICIC using ABS based at least in part on time of day, day of week, or another temporal measurement.

7. The macro cell of claim 1, wherein the macro base station is configured to determine whether or not an attempted application of CAB for the metro cell is warranted and configured to notify a network operator of this condition.

8. The macro cell of claim 1, wherein said macro base station is configured to
   determine whether or not the macro cell is uncongested and whether or not the metro base station is congested while CAB is applied to signal strength measurements associated with the metro base station by the one or more user equipment;
   wherein the macro base station is configured to send another message to the one or more user equipment instructing the corresponding user equipment to remove CAB for signal strength measurements associated with the metro base station after determining the macro cell is uncongested and the metro cell is congested.

9. The macro cell of claim 2, wherein the macro base station is configured to automatically trigger notifications to a network operator to activate and de-activate enhanced Inter Cell Interference Coordination (eICIC) using Almost Blank Subframes (ABS) based at least in part on time of day, day of week, or another temporal measurement after determining an attempted application of CAB for the metro cell is warranted.

10. The macro cell of claim 1, wherein the macro base station is configured to determine whether or not an attempted application of CAB for the metro cell is warranted and configured to notify the metro base station that CAB is being applied for the metro cell.

11. The macro cell of claim 2, wherein the macro base station is configured to determine the initial bias amount based at least in part on calculating a difference between signal strength measurements for the macro base station and signal strength measurements for the metro base station reported by at least one of the one or more user equipment prior to CAB being applied.

12. The macro cell of claim 11, wherein the wireless telecommunications network includes additional metro base stations defining additional metro cells located at least partially within the macro cell;
   wherein the macro base station is configured to iteratively increase the initial bias amount in a predetermined stepwise fashion until the macro cell is no longer congested, all metro cells at least partially within the macro cell are congested, or the maximum supportable bias amount is being used.

13. A method of controlling cell association bias (CAB) in a wireless telecommunications network, the method comprising:
   determining whether or not a first base station is congested, wherein the first base station defines a first cell within a wireless telecommunications network;
   determining whether or not a second base station is uncongested, wherein said second base station defines a second cell within the wireless telecommunications network, wherein the second cell is located at least partially within the first cell; and,
   sending a message from the first base station to one or more user equipment located within the first cell and within an extendable range of the second cell instructing the corresponding user equipment to apply a CAB to signal strength measurements associated with the second base station after determining the first base station is congested and the second base station is uncongested.

14. The method of claim 13, further comprising:
   determining whether or not an attempted application of CAB for the second cell is warranted;
   determining an initial bias amount if the application of CAB is warranted; and
   determining if the initial bias amount exceeds a maximum supportable bias amount;
   wherein the first base station includes the initial bias amount in the message to the one or more user equipment if the initial bias amount does not exceed the maximum supportable bias amount, the corresponding message instructing the corresponding user equipment to apply the initial bias amount to signal strength measurements associated with the metro base station in conjunction with applying CAB.

15. The method of claim 14, further comprising:
   implementing enhanced Inter Cell Interference Coordination (eICIC) using Almost Blank Subframes (ABS) in which the first base station blanks for one or more subframes in conjunction with the application of CAB to signal strength measurements associated with the second base station by the one or more user equipment.

16. The method of claim 15, wherein the wireless telecommunications network includes additional second base stations defining additional second cells located at least partially within the first cell, the method further comprising:
   informing all second base stations associated with second cells at least partially within the first cell when ABS is implemented by the first base station.

17. The method of claim 15, further comprising:
   automatically triggering activation and de-activation of eICIC using ABS based at least in part on time of day, day of week, or another temporal measurement.

18. The method of claim 13, further comprising:
   determining whether or not an attempted application of CAB for the second cell is warranted; and
   notifying the second base station that CAB is being applied for the second cell.

19. The method of claim 14, further comprising:
   determining the initial bias amount based at least in part on calculating a difference between signal strength measurements for the macro base station and signal strength measurements for the metro base station reported by at least one of the one or more user equipment prior to CAB being applied.

20. The method of claim 19, wherein the wireless telecommunications network includes additional second base stations defining additional second cells located at least partially within the macro cell, the method further comprising:
   iteratively increasing the initial bias amount in a predetermined stepwise fashion until the macro cell is no longer congested, all metro cells at least partially within the macro cell are congested, or the maximum supportable bias amount is being used.

21. An apparatus for controlling cell association bias (CAB) in a wireless telecommunications network, the apparatus comprising:

a first base station configured to define a first cell of a wireless telecommunications network and to determine whether or not the first cell is congested;

wherein the first base station is configured to determine whether or not a second base station defining a second cell of the wireless telecommunications network is uncongested, the second cell being located at least partially within the first cell; and, wherein the first base station is configured to send a message to one or more user equipment located within the first cell and within an extendable range of the second cell instructing the corresponding user equipment to apply CAB to signal strength measurements associated with the second base station after determining the first cell is congested and the second cell is uncongested.

22. The apparatus of claim 21, wherein the wireless telecommunications network includes a heterogeneous Long Term Evolution (LTE) network.

23. The apparatus of claim 22, wherein the first base station includes an enhanced Node B (eNodeB).

\* \* \* \* \*